US006290286B1

United States Patent
Murakami et al.

(10) Patent No.: US 6,290,286 B1
(45) Date of Patent: Sep. 18, 2001

(54) CONSTRUCTION MACHINE

(75) Inventors: Yoshihiro Murakami; Makoto Okada; Tomoo Ishihara; Masaaki Murakami, all of Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 09/468,912

(22) Filed: Dec. 22, 1999

(30) Foreign Application Priority Data

Dec. 25, 1998 (JP) .................................................. 10-370696

(51) Int. Cl.[7] ...................................................... B60H 3/00
(52) U.S. Cl. ...................................... 296/190.09; 296/208
(58) Field of Search .......................... 296/190.01, 190.08, 296/190.09, 208; 454/141, 142, 162, 108, 158, 136

(56) References Cited

U.S. PATENT DOCUMENTS

| 4,805,747 | * | 2/1989 | Moedinger et al. | 296/208 X |
| 5,119,718 | * | 6/1992 | Wagner et al. | 296/208 X |
| 6,065,799 | * | 5/2000 | Suwabe et al. | 296/190.08 X |

* cited by examiner

Primary Examiner—D. Glenn Dayoan
Assistant Examiner—Jason Morrow
(74) Attorney, Agent, or Firm—Oblon, Spivak, McClelland, Maier & Neustadt, P.C.

(57) ABSTRACT

A construction machine comprising a floor plate, an air conditioning unit mounted at the rear of an upper surface of the floor plate, an operator's seat mounted in a central portion of the upper surface of the floor plate, a cab installed on the floor plate from top and provided with a front window and a front air conditioning blowing opening at the front part, and a front duct for connecting between the air conditioning unit and the front air conditioning blowing opening and being divided into at least two detachably connected parts, one out of the divided front ducts being connected to the air conditioning unit, the other being connected to the front air conditioning blowing opening. The front duct for connecting between the air conditioning unit and the front air conditioning blowing opening is divided into at least two parts, and the divided front ducts are respectively connected to the air conditioning unit and the front air conditioning blowing opening, respectively, in advance. Therefore, when the cab is installed on the floor plate from top, the divided front ducts are merely connected whereby the work of duct piping to the front air conditioning blowing opening can be completed. Because of this, the work for installing the cab on the floor plate from top can be simplified greatly, and the time necessary for the installing work can be considerably shortened.

3 Claims, 2 Drawing Sheets

CONSTRUCTION MACHINE

BACKGROUND OF THE INVENTION

1. Field of the Invention

The present invention relates to a construction machine having a cab installed on the top of a floor plate.

2. Description of the Related Art

FIG. 3 shows a side view of a conventional hydraulic excavator, as one example of the construction machine. In FIG. 3, the hydraulic excavator comprises a lower travel body 51 provided with a pair of crawlers, an upper rotating structure 52 rotatably mounted above the lower travel body 51, and an attachment 53 mounted for vertical pivotal movement at the front of the upper rotating structure 52. The upper rotating structure 52 is constituted such that a cab 54, an engine, a counterweight and so on are mounted on a machine frame 61. The interior of the cab 54 is provided with an operator's seat, and with a front window on the surface thereof, so that an operator seated on the seat controls the operation of the attachment 53 while looking forward through the front window. Recently, the conventional cab 54 is equipped with an air conditioning unit in order to improve habitability in summer and winter.

The interior of the cab 54 is shown schematically in FIG. 4. In FIG. 4, an air conditioning unit 56 is mounted at the rear of the upper surface of the floor plate 55. An operator's seat 57 is mounted in the central portion of the upper surface of the floor plate 55. In the construction machine such as a hydraulic excavator, since an operator seated on the operator's seat 57 overlooks the work environment through the front window provided at the front part of the cabin 54, it is desired that the front window be as wide as possible. Because of this, the air conditioning unit 56 is normally installed at the rear of the operator's seat 57.

Cool air A or warm air B produced by the air conditioning unit is blown out of a blowing opening for the face 58, a blowing opening for the feet 59, and a blowing opening for the back 60. Since generally, cool air moves down and warm air moves up, the cool air A is mainly blown out of the blowing opening for the face 58 and the blowing opening for the back 60, and the warm air B is mainly blown out of the blowing opening for the feet 59.

One example of the procedure for installing the cab 54 on the floor plate 55 will be explained. Conventionally, in the state in which the operator's seat 57 and the air conditioning unit 56 are mounted on the floor plate 55, the cab 54 lifted from top by a crane or the like is placed on the floor plate 55, and the cab 54 is locked to the floor plate 55, after which ducting and wiring are connected. In case having the blowing opening for the face 58 shown in FIG. 4, the duct for connecting the blowing opening for the face 58 with the air conditioning unit 56 has been mounted by an assembly worker who enters the cab 54 after the cab 54 has been locked to the floor plate 55.

As prior art showing a duct construction for an air conditioning unit within a cab, an arrangement has been known in which the duct directed at a blowing opening of the air conditioning unit at the front part is in integral form that cannot be divided along its length.

Incidentally, conventionally, work for connecting various wiring and a ducts for installing the cab 54 on the floor plate 55 is carried out by a worker who enters the narrow cab 54, thus posing a problem that the work becomes cumbersome and difficult. Particularly, the blowing opening for the face 58 must be mounted on the cab 54 side instead of the floor plate 55 side in terms of restriction of the arranging position thereof. Therefore, piping work of the duct for connecting the air conditioning unit 56 mounted on the floor plate 55 with the blowing opening for face 58 mounted on the cab 54 must be carried out when the cab 54 and the floor plate 55 are installed. This work is not easy because it is done in a narrow place, and therefore, the production time becomes long.

Further, it has been recently desired, in order to improve viewing and working properties in rainy weather or in cold weather, that a blowing opening for defrosting is provided around the front window for removing fogging of the front window. In this case, duct piping for the blowing opening for defrosting in addition to the duct piping for the blowing opening for the face 58 is necessary, thus the problem which occurs with the aforementioned duct piping work becomes more notable.

SUMMARY OF THE INVENTION

It is an object of the present invention to provide a construction machine in which work for installing a cab on a floor from top is facilitated to thereby enable shortening of assembly time.

A construction machine of the present invention has a floor plate, an air conditioning unit mounted at the rear of an upper surface of the floor plate, an operator's seat mounted in a central portion of the upper surface of the floor plate, a cab installed on the floor plate from top and provided with a front window and a front air conditioning blowing opening at the front part, and a front duct for connecting between the air conditioning unit and the front air conditioning blowing opening and being divided into at least two detachably connected parts, one out of said divided front ducts being connected to the air conditioning unit, the other being connected to the front air conditioning blowing opening.

According to the present invention, the front duct for connecting between the air conditioning unit and the front air conditioning blowing opening is divided into at least two detachably connected parts, and the divided front ducts parts are respectively connected to the air conditioning unit and the front air conditioning blowing opening, respectively, in advance. Therefore, when the cab is installed on the floor plate from top, the divided front duct parts are merely connected, whereby the work of duct piping to the front air conditioning blowing opening can be completed. Because of this, the work for installing the cab on the floor plate from top can be simplified greatly, and the time necessary for the installing work can be considerably shortened.

A flexible portion can be provided on at least one of the front ducts.

In the process of installing the cab on the floor plate from top, the front duct having the flexible portion provided thereon is bent in the central portion of the floor plate to thereby prevent interference between the front duct mounted on the cab side and the front duct mounted on the floor plate side. Thereby, it is easy to locate the cab on the floor plate. Therefore, the work for installing the cab on the floor plate from top can be further simplified, and the time necessary for the installing work can be also further shortened. Further, since an error can be absorbed by the flexible portion, accuracy for mounting the duct on the cab or the floor plate can be lowered, by which simplification of work and shortening of assembly time can be achieved.

Alternatively, the front air conditioning blowing opening may comprise a blowing opening for the face and a blowing opening for defrosting, the front duct may comprise a duct for the face and a duct for defrosting, and the duct for the face and the duct for defrosting may be arranged one upon the other.

In this case, as there are provided the blowing opening and duct for defrosting, fogging on the front window can be prevented, and the forward viewing can be improved. Further, since the duct for the face and the duct for defrosting may be arranged one upon the other, a side space for the cab is not so necessary. Accordingly, a wide space inside the cab can be obtained without sacrificing space within the cab. Further, since both the duct for the face and the duct for defrosting can be divided, the work for installing the cab on the floor from the top is simple despite the provision of two ducts, and the time required for the installing work can be shortened.

DESCRIPTION OF THE PREFERRED EMBODIMENTS

Preferred embodiments of the present invention will be described with reference to the drawings.

Figure 1:
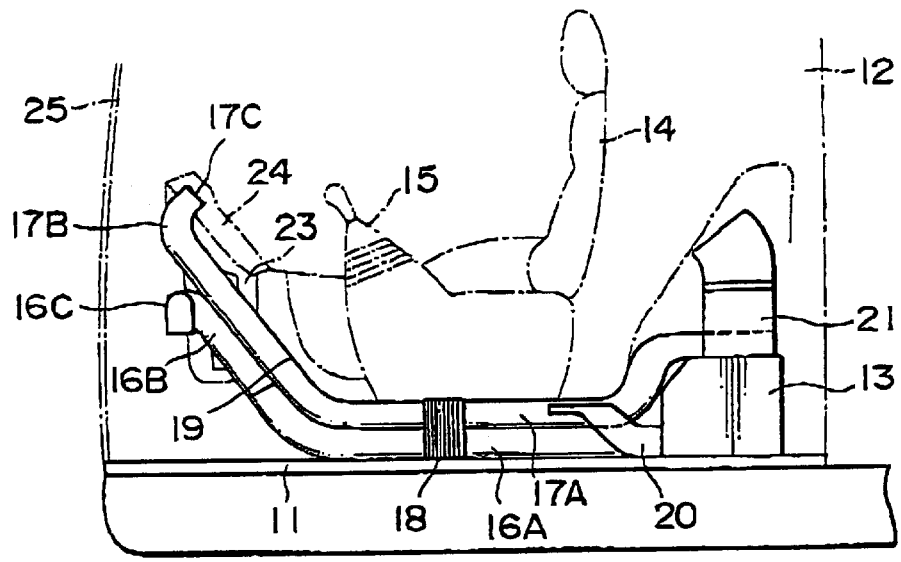
FIG. 1 is a side view of a cab of a hydraulic excavator to which the present invention is applied.
Figure 2:
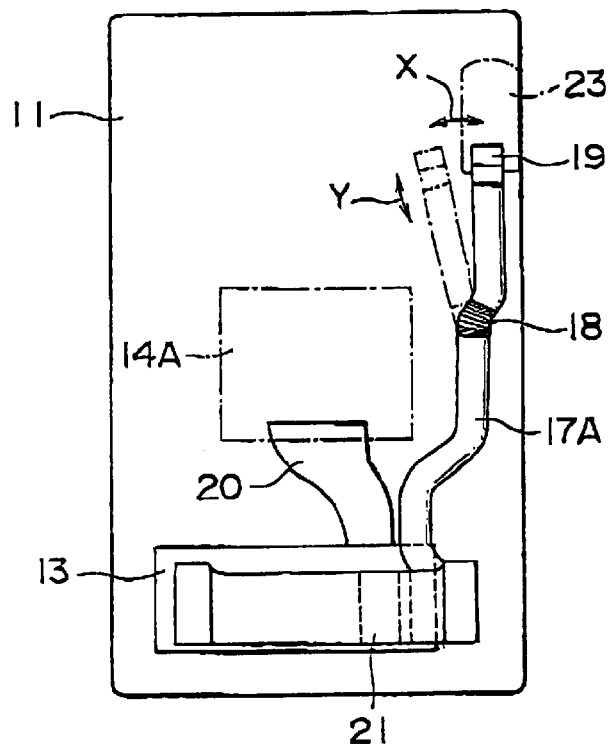
FIG. 2 is a plan view of a cab of a hydraulic excavator to which the present invention is applied.
Figure 3:
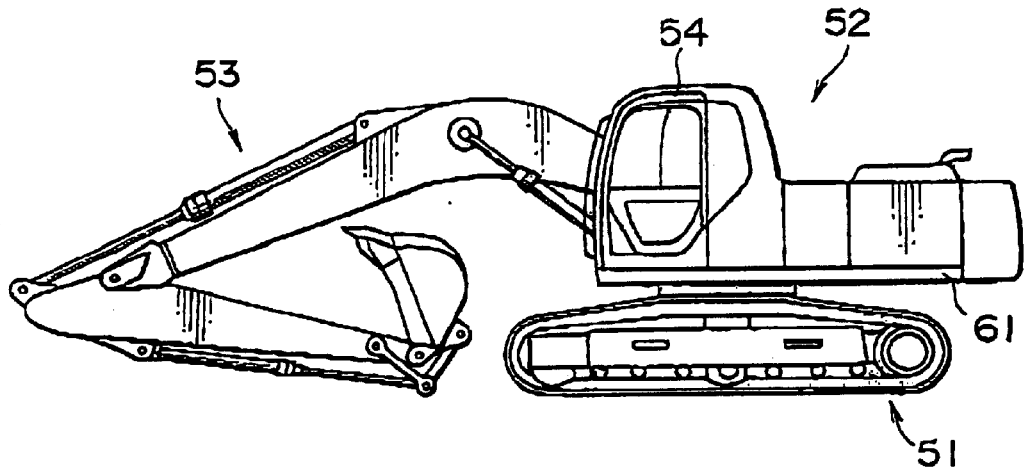
FIG. 3 is a side view of a cab of a hydraulic excavator as one example of a construction machine to which the present invention is applied.
Figure 4:
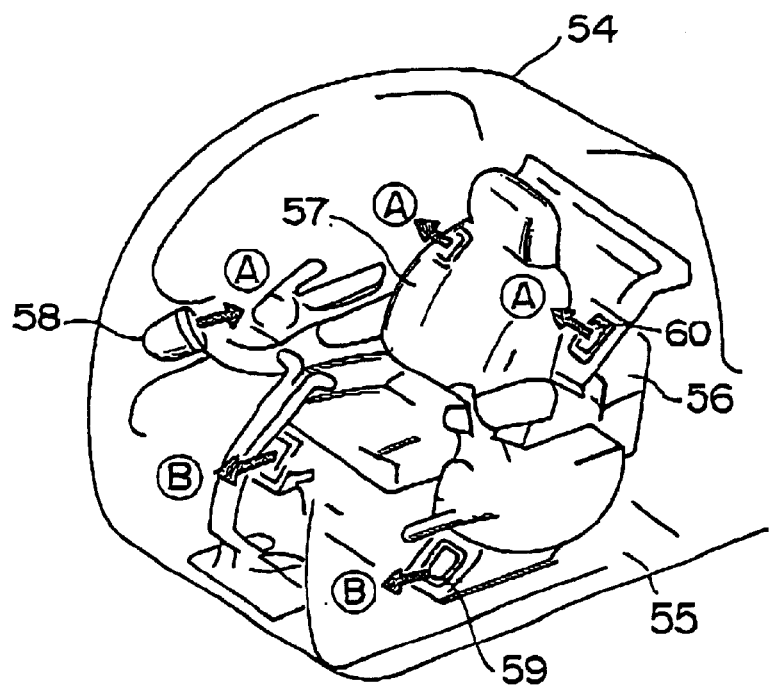
FIG. 4 is an explanatory view showing schematically an internal arrangement of a conventional cab.

FIG. 1 is a side view showing a cab of a hydraulic excavator to which the present invention is applied, and FIG. 2 is a plan view thereof. FIGS. 1 and 2 show the portions relating to the present invention, portions less related to the present invention being omitted or simplified. FIGS. 1 and 2 shows a hydraulic excavator as one example of a construction machine to which the present invention is applied.

In FIGS. 1 and 2, numeral 11 designates a floor plate placed and supported on a rotatable superstructure. A cab 12 is installed on the floor plate 11 from the top. In case of the present embodiment, the cab 12 is separately assembled and is lifted by a crane and carried to the upper portion of the floor plate 11, and the cab 12 is placed on the floor plate 11, after which the cab 12 is secured to the floor plate 11 by bolts and nuts.

An air conditioning unit 13 is mounted at the rear of the upper surface of the floor plate 11. An operator's seat 14 is mounted on an upper central portion 14A of the floor plate 11. Falling operating levers 15 having a console panel are arranged on both sides of the operator's seat. In case of the present embodiment, since the air conditioning unit 13 is provided at the rear of the upper surface of the floor plate 11, the field of vision of a front window is not impaired by the air conditioning unit 13.

Numeral 16 designates a duct for defrosting comprising a base portion 16A and an end 16B. Numeral 17 designates a duct for the face comprising a base portion 17A and an end 17B. The duct for defrosting 16 and the duct for the face 17 are guided from the right side of the air conditioning unit 13 to forwardly of the floor plate 11. The duct for defrosting base 16A and the duct for defrosting end 16B, and the duct for the face base 17A and the duct for the face end 17B can be respectively connected by a connecting portion 19. Further, the extreme ends of the duct for defrosting end 16B and the duct for the face end 17B serve as a blowing opening for defrosting 16C and a blowing opening for the face 17C, respectively, the blowing opening for defrosting 16C being directed at the front window 25, and the blowing opening for the face 17C being directed at the face of an operator seated on an operator's seat 14. Cool air is mainly blown out of the blowing opening for the face 17C.

In case of the present embodiment, the blowing opening for the face 17C and the blowing opening for defrosting 16C constitute "a front air conditioning blowing opening" of the present invention. In addition, the duct for defrosting 16B and the duct for the face 17 constitute "a front duct" of the present invention.

Further, flexible portions 18 are formed in central portions of the duct for defrosting base 16A and the duct for the face base 17A, respectively. The duct for defrosting base 16A and the duct for face base 17A, respectively, can be moved in directions X and Y in FIG. 2 by deformation of the flexible portions 18.

When the work for installing the cab 12 on the floor plate 11 is carried out, the duct for defrosting base 16A and the duct for the face base 17A, respectively, are collectively bent and reduced by the flexible portions 18 as indicated by the dotted line in FIG. 2. With this, even if the cab 12 is placed from the top, no interference between the duct and other internal parts occurs. In the state in which the duct for defrosting base 16A and the duct for face base 17A, respectively, are bent and reduced by the flexible portions 18, the cab 12 is secured to the floor plate 11, and thereafter, the duct for defrosting base 16A and the duct for the face base 17A are inserted into the duct for defrosting end 16B and the duct for the face at end 17B, respectively.

While in the present embodiment, the ducts can be moved in both the directions X and Y in FIG. 2, it is noted that they may be moved only in the direction of X. In this case, the duct and the flexible portion can be molded integrally to reduce the manufacturing cost.

Further, the duct for defrosting 16 and the duct for the face 17 are put one upon the other and intensively arranged on the right side of the floor plate 11. Therefore, the ducts can be compact so that the space in the cab is not much used. Further, this will not impair lifting of the cab. However, the duct for defrosting 16 and the duct for the face 17 need not always be arranged one upon the other but may be arranged in parallel in a lateral direction.

While in case of the present embodiment, two ducts, the duct for defrosting and the duct for the face, are arranged, it is noted that either one of them will suffice. Further, even if more than three ducts are arranged, the present invention can be carried out.

Further, while in case of the present embodiment, the flexible portions are provided in the ducts 16A and 17A at the base, the flexible portions can be also provided in the ducts 16B and 17B at an end. Further, a plurality of flexible portions can be also provided.

Further, while in case of the present embodiment, the front duct for connecting between the air conditioning unit and the front air conditioning blowing opening is divided into two parts, it is noted that the front duct may be divided into three parts or more. In this case, after the cab is installed on the floor plate, the central duct may be connected to both the ducts on the end side and the base side.

The air conditioning unit 13 is provided in the front surface with a duct for the feet 20, which extends toward the lower portion of the operator's seat 14. The extreme end of the duct for the feet 20 is formed to be flat so that blowing air from the air conditioning unit is blown against the foot of an operator through the lower portion of the operator's seat 14. Warm air is mainly blown out of the duct 20 for the feet.

Further, the air conditioning unit 13 is provided in the upper surface with a rear duct 21 which extends upward, the rear duct 21 being branched to left and right at the upper part. Cold air is mainly blown out of the rear duct 21.

Now, the constitution of the cab 12 side will be described. A front window 25 is provided on the front surface of the cab 12. A cluster bracket 23 having a cluster panel 24 is secured to the front portion on the right side of the cab 12, and both the duct for defrosting end 16B and the duct for the face end 17B are secured to the cluster bracket 23.

Accordingly, when the cab 12 is installed on the floor plate 11, the duct for defrosting end 16B and the duct 17B for the face end are hung down from the cluster bracket 23. In this state, the cab 12 is placed on the floor plate 11 in the state in which the duct for defrosting base 16A and the duct for the face base 17A are bent in the central direction of the flexible portion 16. Then, the thus placed cab 12 is secured to the floor plate 11 by bolts or the like, and thereafter the duct for defrosting end 16B and the duct for the face end 17B are inserted into and connected to the duct for defrosting base 16A and the duct for the face base 17A, respectively.

While in the aforementioned embodiment, an example of the hydraulic excavator has been shown, it is noted that the present invention is not limited in application thereof to the hydraulic excavator. For example, the invention can be also applied to various working machines having a cab such as a cannibalizing machine provided with a nibbler, a crusher with a breaker, or a wheel loader, a crane and so on.

We claim

1. A construction machine comprising:

a floor plate;

an air conditioning unit mounted at a rear of an upper surface of the floor plate;

an operator's seat mounted in a central portion of the upper surface of the floor plate;

a cab installed on the floor plate from top and provided with a front window and a front air conditioning blowing opening at the front part; and a front duct for connecting between the air conditioning unit and the front air conditioning blowing opening, said front duct comprising at least two parts to be detachably connected to each other, one of the parts being connected to the air conditioning unit, the other of the parts being connected to the front air conditioning blowing opening.

2. The construction machine according to claim 1, further comprising:

a flexible portion provided on at least one of said front duct.

3. The construction machine according to claim 2, wherein said front air conditioning blowing opening comprises a blowing opening for face and a blowing opening for defrosting, and said front duct comprises a duct for face and a duct for defrosting, said duct for face and said duct for defrosting being arranged one upon the other.

* * * * *